(12) United States Patent
Hu

(10) Patent No.: US 11,042,054 B2
(45) Date of Patent: Jun. 22, 2021

(54) DISPLAY PANEL AND DISPLAY DEVICE

(71) Applicants: HKC Corporation Limited, Guangdong (CN); Chongqing HKC Optoelectronics Technology Co., Ltd., Chongqing (CN)

(72) Inventor: Yunqin Hu, Guangdong (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 177 days.

(21) Appl. No.: 16/255,819

(22) Filed: Jan. 24, 2019

(65) Prior Publication Data
US 2020/0103682 A1 Apr. 2, 2020

Related U.S. Application Data

(63) Continuation of application No. PCT/CN2018/119173, filed on Dec. 4, 2018.

(30) Foreign Application Priority Data

Sep. 30, 2018 (CN) .......................... 201821620796.0

(51) Int. Cl.
*G02F 1/1335* (2006.01)
*G02F 1/1333* (2006.01)
*G02F 1/1339* (2006.01)

(52) U.S. Cl.
CPC .......... *G02F 1/1333* (2013.01); *G02F 1/1339* (2013.01); *G02F 1/133512* (2013.01); *G02F 1/133354* (2021.01); *G02F 2201/123* (2013.01)

(58) Field of Classification Search
CPC ............. G02F 1/1333; G02F 1/133512; G02F 1/133514; G02F 1/1339; G02F 1/133354; G02F 2201/123
See application file for complete search history.

(56) References Cited

U.S. PATENT DOCUMENTS

| 8,986,909 B2 * | 3/2015 | Bae | ................. | G03F 7/0002 |
| | | | | 430/5 |
| 2011/0063550 A1* | 3/2011 | Gettemy | ............... | G02F 1/1333 |
| | | | | 349/110 |

(Continued)

FOREIGN PATENT DOCUMENTS

| CN | 102289111 | * | 9/2011 | ........... G02F 1/1339 |
| CN | 102289111 A | | 12/2011 | |

(Continued)

*Primary Examiner* — Rajarshi Chakraborty
*Assistant Examiner* — Fatima N Farokhrooz

(57) ABSTRACT

The present disclosure provides a display panel and a display device, the display panel includes a first substrate, the first substrate defines a photoresist layer; a second substrate, the second substrate defines an identification region, a surface of the first substrate having the photoresist layer faces a surface of the second substrate having the identification region; and a frame glue, the frame glue is defined between the first substrate and the second substrate, and the frame glue encloses a space between the first substrate and the second substrate to form a filling area, and the identification region is defined at the outside of the frame glue; the photoresist layer defines an anti-overflow groove located at an area between the identification region and the frame glue.

18 Claims, 3 Drawing Sheets

(56) References Cited

U.S. PATENT DOCUMENTS

| | | | | |
|---|---|---|---|---|
| 2011/0255041 A1* | 10/2011 | Inoue | ................ | G02F 1/133723 |
| | | | | 349/123 |
| 2012/0019762 A1* | 1/2012 | Tanaka | .................. | G02F 1/1341 |
| | | | | 349/153 |
| 2014/0285754 A1* | 9/2014 | Lee | ................... | G02F 1/133711 |
| | | | | 349/106 |
| 2018/0120640 A1* | 5/2018 | Nitanai | ............ | G02F 1/133608 |

FOREIGN PATENT DOCUMENTS

| | | | | | |
|---|---|---|---|---|---|
| CN | 102566824 A | | 7/2012 | | |
| CN | 102707509 A | | 10/2012 | | |
| CN | 104698704 A | * | 6/2015 | ....... | G02F 1/133512 |
| CN | 204576027 U | | 8/2015 | | |
| CN | 107167950 A | | 9/2017 | | |
| JP | 2015138181 A | | 7/2015 | | |

* cited by examiner

DISPLAY PANEL AND DISPLAY DEVICE

CROSS-REFERENCE TO RELATED APPLICATIONS

The present disclosure is a Continuation Application of PCT Application No. PCT/CN2018/119173, filed Dec. 4, 2018, which claims the benefit of Chinese Patent Application No. 201821620796.0, filed Sep. 30, 2018, with the State Intellectual Property Office and entitled "display panel and display device", the entirety of which is hereby incorporated herein by reference.

TECHNICAL FIELD

The present disclosure generally relates to the technical field of liquid crystal display, and more particularly relates to a display panel, and a display device using the display panel.

BACKGROUND

Liquid crystal panel includes an array substrate, the method for manufacturing the array substrate includes manufacturing a thin film transistor (TFT) and a color filter (CF), as well as coating frame glue, filling liquid crystals, aligning and pressing the thin film transistor array substrate with the color filter substrate, and curing of the frame glue. When pressing the thin film transistor array substrate with the color filter substrate, the frame glue between the two substrates may overflow, and the overflow frame glue may block alignment marks on the substrate, so that the alignment marks cannot be accurately identified in the following process, resulting in the degradation of the quality of the display panel.

SUMMARY

It is therefore one main object of the disclosure to provide a display panel, which aims to prevent the alignment mark from being blocked even if the frame glue overflows, so that the alignment in the display panel manufacturing process would be accurate and the yield is improved.

In order to realize the above aim, the display panel provided by the present disclosure includes:

a first substrate, the first substrate defines a photoresist layer;

a second substrate, the second substrate defines an identification region, a surface of the first substrate having the photoresist layer faces a surface of the second substrate having the identification region; and a frame glue, the frame glue is defined between the first substrate and the second substrate, and the frame glue encloses a space between the first substrate and the second substrate to form a filling area, and the identification region is defined at the outside of the frame glue;

the photoresist layer defines an anti-overflow groove, and the anti-overflow groove is located at an area between the identification region and the frame glue.

Optionally, the anti-overflow groove is arranged at an angle or in an arc shape.

Optionally, the anti-overflow groove includes at least one groove, and when there are a plurality of grooves, the plurality of grooves are spaced from each other and defined between the identification region and the frame glue.

Optionally, the anti-overflow groove has a width of 20 micrometers to 1000 micrometers.

Optionally, the first substrate is a color film substrate, and the second substrate is an array substrate.

Optionally, the first substrate includes a base substrate, and the photoresist layer includes a black matrix coated on the base substrate; the anti-overflow groove is defined in the black matrix.

Optionally, the first substrate further includes a pixel electrode layer coated on the black matrix layer, and the pixel electrode layer forms a recess in the area where the anti-overflow groove is located.

Optionally, there are a plurality of identification regions, and the plurality of identification regions are respectively located at corners of the second substrate.

Optionally, the identification region defines an alignment mark, and the alignment mark defines a cross pattern.

Optionally, the photoresist layer further defines a light transmitting hole, and the light transmitting hole faces the identification region, and the identification region is identified by a side of the first substrate away from the second substrate.

The present disclosure further provides a display panel, the display panel includes:

a first substrate, the first substrate includes a base substrate and a black matrix coated on the base substrate, the black matrix defines a plurality of light transmission holes;

a second substrate, the second substrate includes a plurality of identification regions, and the plurality of identification regions are respectively located at corners of the second substrate, and a surface of the first substrate having the black matrix faces a surface of the second substrate having the identification regions;

a frame glue, the frame glue is defined between the first substrate and the second substrate, and the frame glue encloses a space between the first substrate and the second substrate to form a filling area, and the identification regions are defined at the outside of the frame glue;

the light transmitting holes face the identification regions, the identification regions are identified by a side of the first substrate away from the second substrate, the black matrix further defines an anti-overflow groove, and the anti-overflow groove is located at an area between the identification region and the frame glue.

The present disclosure further provides a display device, the display device includes a housing, a backlight module received in the housing, and a display panel embedded in the housing, the display panel is the display panel as described in the claims, light emitted by the backlight module irradiates the display panel, and an image displays on the display panel;

the display panel includes:

a first substrate, the first substrate defines a photoresist layer;

a second substrate, the second substrate defines an identification region, a surface of the first substrate having the photoresist layer faces a surface of the second substrate having the identification region; and a frame glue, the frame glue is defined between the first substrate and the second substrate, and the frame glue encloses a space between the first substrate and the second substrate to form a filling area, and the identification region is defined at the outside of the frame glue;

the photoresist layer defines an anti-overflow groove, and the anti-overflow groove is located at an area between the identification region and the frame glue.

In the technical solution of the present disclosure, the second substrate defines the identification region which can be identified by the identification device, and the identification region is used as a reference so as to facilitate accurate alignment in each process of the display panel. The photoresist layer of the first substrate defines the anti-overflow groove which is located between the identification region and the frame glue. During the process of aligning and bonding the first substrate with the second substrate, the frame glue between the two may overflow. If the frame glue flows toward the identification region during the overflowing process of the frame glue, the frame glue may flow into the anti-overflow groove first. The frame glue needs to fill the anti-overflow groove before continuously flowing toward the identification region. Therefore, the anti-overflow groove effectively reduces the risk of covering the identification region during the overflowing process of the frame glue and improves the alignment accuracy in the manufacturing process of the display panel.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art may now be briefly described, it is evident that the accompanying drawings listed in the following description show merely some embodiments according to this disclosure, and that those having ordinary skill in the art may be able to obtain other drawings based on the arrangements shown in these drawings without making inventive efforts.

Figure 1:
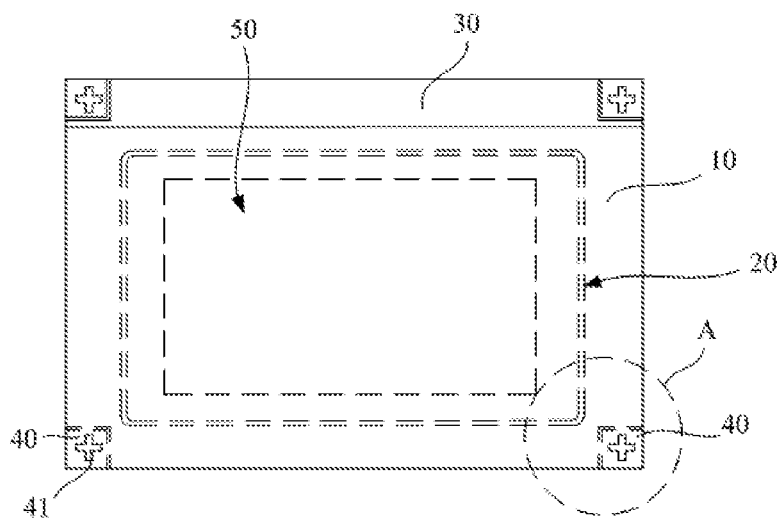
FIG. 1 is a structural diagram of the display panel of the present disclosure according to some embodiments.

The realization of the aim, functional characteristics, advantages of the present disclosure are further described specifically with reference to the accompanying drawings and embodiments.

DETAILED DESCRIPTION

The technical solutions of the embodiments of the present disclosure may be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In addition, the descriptions, such as the "first", the "second" in the exemplary embodiment of present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

Referring to FIGS. 1 to 4, the present disclosure provides a display panel which includes:

a first substrate 10, the first substrate 10 defines a photoresist layer 13;

a second substrate 30, the second substrate 30 defines an identification region 40, a surface of the first substrate 10 having the photoresist layer 13 faces a surface of the second substrate 30 having the identification region 40; and a frame glue 20, the frame glue 20 is defined between the first substrate 10 and the second substrate 30, and encloses a space between the first substrate 10 and the second substrate 30 to form a filling area, and the identification region 40 is located outside the frame glue 20.

The photoresist layer 13 defines an anti-overflow groove 131, and the anti-overflow groove 131 is located in the area between the identification region 40 and the frame glue 20.

In the technical solution of the present disclosure, the second substrate 30 defines the identification region 40 which can be identified by the identification device, and the identification region 40 is used as a reference so as to facilitate accurate alignment in each process of the display panel. The photoresist layer 13 of the first substrate 10 defines the anti-overflow groove 131 which is located between the identification region 40 and the frame glue 20. During the process of aligning and bonding the first substrate 10 with the second substrate 20, the frame glue 20 between the two may overflow. If the frame glue 20 flows toward the identification region 40 during the overflowing process of the frame glue 20, the frame glue 20 may flow into the anti-overflow groove 131 first. The frame glue 20 needs to fill the anti-overflow groove 131 before continuously flowing toward the identification region 40. Therefore, the anti-overflow groove 131 effectively reduces the risk of covering the identification region 40 during the overflowing process of the frame glue 20 and improves the alignment accuracy in the manufacturing process of the display panel.

When the array substrate and the color film substrate in the display panel are attached to each other, the base substrate at the edge thereof defines the frame glue 20. The frame adhesive 20 is an adhesive that adheres the array substrate and the color film substrate together while maintaining a certain gap between the array substrate and the color film substrate, and then the liquid crystals are filled in the area surrounded by the frame adhesive 20 and sealed, so that the liquid crystals cannot leak, and at the same time external contaminations are also prevented from entering. This adhesive is also called the frame adhesive. There are two main types of frame glue 20 in the display panel: thermal curing glue and ultraviolet (UV) curing glue. The main difference between the two kinds of frame glue 20 is the different curing methods. The thermal curing glue is widely used. However, in the manufacture of high-precision liquid crystal display screens, UV curing glue is superior to thermal curing glue in curing time, adhesion, moisture resistance, heat resistance and other aspects. In particular, the curing time is short, the production cycle is shortened, and the dislocation of two pieces of glass in the long-time curing process is prevented. In the present disclosure, the frame glue can be selected as UV curing glue, the composition of the UV curing glue contains modified acrylate compound, and the appearance is yellowish viscous liquid. When working, the gel-like UV curing glue is uniformly coated on border position of the surface of the array substrate or the color film substrate, and after the array substrate and the color film substrate are bonded together, the glue is cross-linked from a linear macromolecular structure to a stable network structure by ultraviolet irradiation, thus having strong adhesive ability and bonding the two substrates together.

The display panel generally includes an active area and a non-display area.

The active area refers to an area where the substrate can display text images, and can be arranged in the middle area of the substrate. The active area is the area enclosed by the frame glue 20 shown in FIG. 1. The non-display area refers to an area where the text image cannot be displayed, and is generally set surround the active area. The non-display area is configured to arrange traces of circuit and other driving electronic components.

In the technical solution of the present disclosure, the structure of the anti-overflow groove 131 is not specifically limited. In some embodiments, the anti-overflow groove 131 may be arranged at an angle. In this embodiment, the anti-overflow groove 131 is composed of at least two sections, one end of one section communicates with one end of the other section to forms an angle. Optionally, the two sections of the anti-overflow groove 131 are perpendicular to each other. In some embodiments, the anti-overflow groove 131 may in an arc shape. It may be understood that the anti-overflow groove 131 may also have a strip structure or a line structure, which are all within the scope of protection of the present disclosure.

In some embodiments of the present disclosure, the anti-overflow groove 131 includes at least one groove. Referring to the embodiment shown in FIGS. 3 and 4, each anti-overflow groove 131 includes one groove. In order to further prevent the overflow frame glue 20 from crossing the anti-overflow groove 131 to cover the identification region, in some embodiments, the anti-overflow groove 131 includes a plurality of grooves which are arranged between the identification region 40 and the frame glue 20 and spaced from each other. The plurality of grooves can block the frame glue 20 in the overflow process many times, and in each blocking process, the time for the frame glue 20 to approach the identification region is prolonged, thus prolonging the time for the frame glue 20 to coagulate, further increasing the possibility of the frame glue 20 to coagulate before reaching the identification region, and further reducing the risk of the frame glue 20 blocking the identification region. The plurality of grooves can also be arranged side by side in the area between the identification region 40 and the frame glue 20, so that the overflow frame glue can gradually fill the plurality of grooves to achieve the effect of further preventing overflow.

The groove can be a through hole running through the entire photoresist layer, or can be a non-through groove, and the depths of the grooves can be selected according to specific needs, which are all within the scope of protection of this present disclosure.

In the technical solution of the present disclosure, the width of the anti-overflow groove 131 ranges from 20 micrometers to 1000 micrometers. When the length of the anti-overflow groove 131 is constant, the larger the width, the more overflow frame glue 20 can be accommodated, and the less easily the identification region is covered. Optionally, the width of the anti-overflow groove 131 may also range from 900 micrometers to 1000 micrometers, 800 micrometers to 700 micrometers, 500 micrometers to 600 micrometers, 300 micrometers to 400 micrometers, 100 micrometers to 200 micrometers, 50 micrometers to 90 micrometers, or 30 micrometers to 40 micrometers. Of course, the width of the anti-overflow groove 131 can be any value in the above range, depending on the distance between the frame glue 20 of different products and the identification region, and the width of the anti-overflow groove 131 is smaller than the distance between the frame glue 20 and the identification region.

In some embodiments of the present disclosure, the first substrate 10 is a color film substrate and the second substrate 30 is an array substrate. The anti-overflow groove 131 is provided in the color film substrate, and the identification region 40 is provided on the array substrate. It may be appreciated that the identification region 40 may also be provided on the color film substrate.

In the manufacturing process of the display panel, after the frame glue is arranged on the color film substrate, the array substrate and the color film substrate are aligned and bonded. It is also possible to place the frame glue on the array substrate first, and then align and bond the color film substrate with the entire array substrate. Alternatively, the array substrate and the color film substrate are both provided with frame glue, and then the two are aligned and bonded. All of the above methods can realize the alignment process between the array substrate and the color film substrate, which are not specifically limited here.

In some embodiments, the first substrate 10 includes a base substrate 11, and the photoresist layer 13 includes a black matrix coated on the base substrate 11. The anti-overflow groove 131 is provided in the black matrix.

The black matrix is coated on the first substrate 10 and is arranged to define a light transmission region and an opaque region on the first substrate 10. The anti-overflow groove 131 can be made in the black matrix by slightly improving the mask plate in the conventional process of the black matrix without excessive cost investment, the risk of covering the identification region 40 on the color film substrate can be reduced, and the accuracy of alignment in the process of the display panel can be improved.

Figure 3:
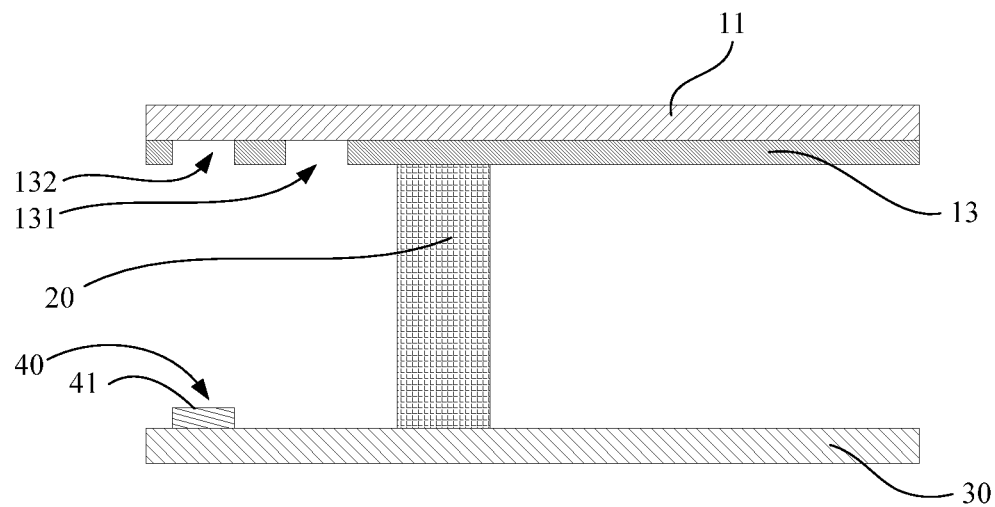
FIG. 3 is a cross sectional diagram taken along the direction B-B shown in FIG. 2.

Referring to FIG. 3, if the frame glue 20 in the drawings blocks the identification region 40 from the array substrate to the color film substrate during the overflow process, although the identification region 40 can still be identified from the side of the array substrate away from the color film substrate, the overflow frame glue 20 changes the background color in the identification region 40, which may reduce the alignment accuracy. Therefore, in some embodiments, the anti-overflow groove 131 is provided in one side of the color film substrate, so that the overflow frame glue 20 may fill the anti-overflow groove 131 first and may not flow directly to the identification region 40.

In order to further improve the anti-overflow effect of the frame glue 20, anti-overflow grooves 131 may also be provided on both the array substrate and the color film substrate.

In some embodiments of the present disclosure, the first substrate 10 further includes a pixel electrode layer 15 (ITO) coated on the black matrix layer, and the pixel electrode layer 15 forms a recess 151 in the area where the anti-overflow groove 131 is located.

In the process for manufacturing the liquid crystal panel having a vertical alignment (VA) mode, the pixel electrode layer 15 is coated on the black matrix layer to provide a reference potential. The pixel electrode layer 15 is coated on the black matrix by a conventional process, and the black matrix defines the anti-overflow grooves 131 in advance. When the pixel electrode layer 15 is coated on the black matrix, a recess 151 is formed in an area of the pixel electrode layer 15 where the anti-overflow groove 131 is located, and the overflow frame glue 20 can be blocked by the recess 151. The specific process is the same as the process of the anti-overflow grooves 131 blocking the frame glue 20 discussed above, and no need to be repeated again.

In the process for manufacturing the liquid crystal panel having an in-plane switching (IPS) mode, the overflow frame glue 20 is stopped directly by the anti-overflow groove 131 on the black matrix without defining the pixel electrode layer 15.

Referring to FIG. 1, there are a plurality of identification regions 40 which are respectively located at the corners of the second substrate 30. In the conventional manufacturing process of the display panel, most of the identification regions 40 are located at the corners. It is understood that in other embodiments, the identification regions 40 may also be located at the edges of the second substrate 30 to meet the needs of different manufacturing processes.

Figure 5:
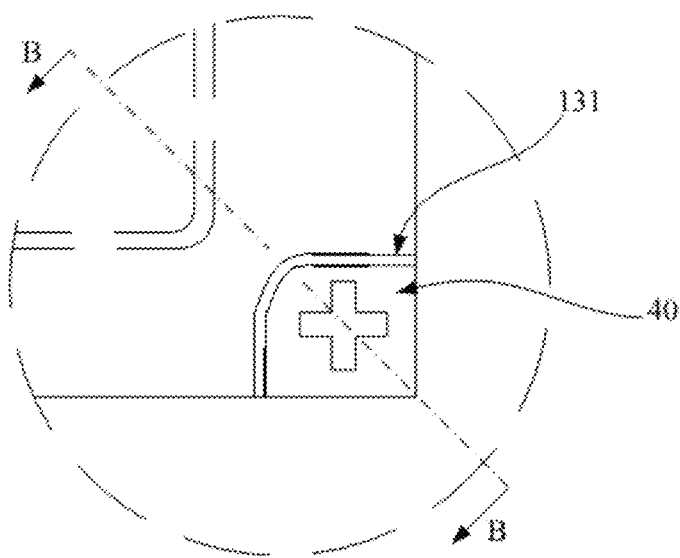
FIG. 5 is an enlarged diagram of portion A with anti-overflow groove being in an arc shape different from that arranged at an angle shown in FIG. 1.

Referring to FIGS. 1 and 5, the identification regions 40 are all arranged at the corners of the second substrate 30. Accordingly, the anti-overflow grooves 131 can be arranged to have an angle structure, each corner defines the anti-overflow groove 131, and the anti-overflow grooves 131 are arranged in two sections, one end of one section communicates with one end of the other section to form the angle, and the other ends of the two sections extend toward the edges of the second substrate 30. In alternative embodiments, the two sections of the anti-overflow grooves 131 are enclosed with two sides of the second substrate 30 to form a quadrangle. In some embodiments, the anti-overflow groove 131 may be provided with an arc structure.

Figure 2:
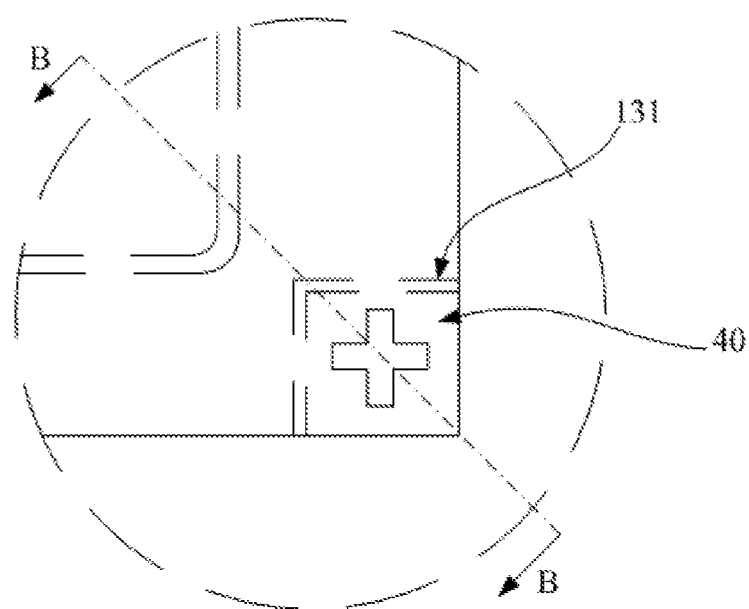
FIG. 2 is an enlarged diagram of portion A shown in FIG. 1.

Referring to FIGS. 1 and 2, the identification region 40 defines an alignment mark 41. The alignment mark 41 can be directly made in the manufacturing process of the first substrate 10 without adding a new process, so as to achieve the purpose of saving cost and improving production efficiency. When the second substrate 30 is the array substrate, the alignment mark 41 can be made together with the metal layer on the array substrate, and the alignment mark 41 has a cross pattern. It may be understood that the identification region 40 may also be defined on the color film substrate. If the alignment mark 41 can be formed on the color film substrate, the alignment mark 41 may be made together with the black matrix. The alignment mark 41 may has the cross-shaped pattern, or a shape like "※", or other shape that are favorable for alignment and identification, all of which are within the scope of protection of this present disclosure.

Figure 4:
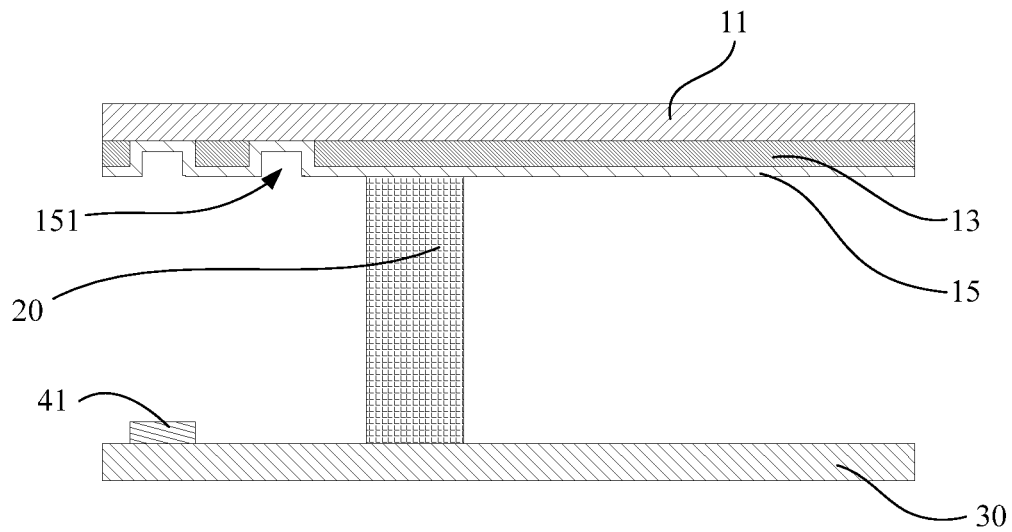
FIG. 4 is a cross sectional diagram of the display panel shown in FIG. 3 according to another embodiments.

Referring to FIGS. 3 and 4, in some embodiments of the present disclosure, the photoresist layer 13 is also provided with a light transmitting hole 132, which faces the identification region 40, the identification region 40 can be identified by the side of the first substrate 10 away from the second substrate 30.

Since the photoresist layer 13 is a black matrix, the black matrix has a light transmitting structure. A light transmitting hole 132 is formed in the photoresist layer 13, allowing that the identification region 40 can be identified by the identification device through the first substrate 10. With this structure, the identification region 40 located on the second substrate 30 can be identified not only from the outside of the second substrate 30, but also from the outside of the first substrate 10, further improving the alignment accuracy in the production process of the display panel.

Figure 6:
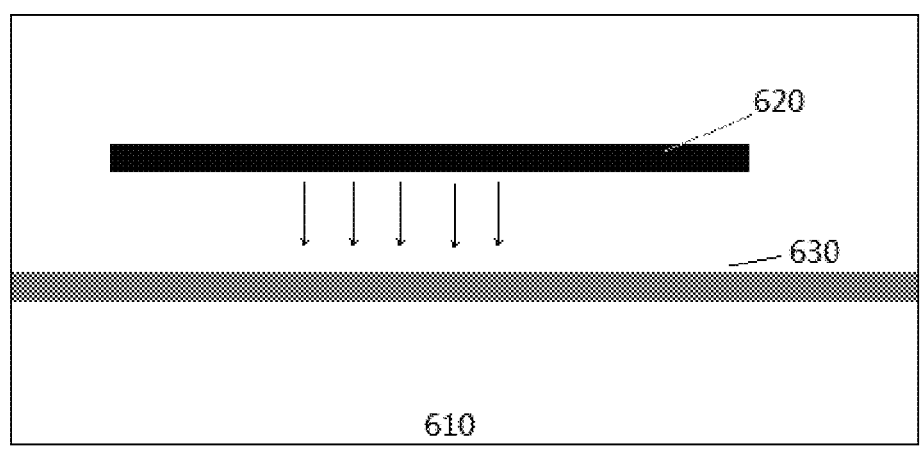
FIG. 6 is a structural diagram of a display device of the present disclosure according to some embodiments.

Referring to FIG. 6, the present disclosure also provides a display device 600, which includes an array substrate and a color film substrate. The specific structure of the color film substrate refers to the above embodiments. As the display panel adopts all the technical proposals of the above exemplary embodiments, the display panel at least has all of the beneficial effects of the technical proposals of the above exemplary embodiments, no need to repeat again. The backlight module 620 is received in the housing 610, the display panel 630 is embedded in the housing 610, light emitted by the backlight module 620 irradiates the display panel 630, and an image displays on the display panel 630. The display device can be a liquid crystal display, a television display, a computer display, or display screens of other medical or engineering detection instruments, the display device can also be a mobile phone display screen, or a display screen of wearing equipment.

The foregoing description merely depicts some embodiments of the present disclosure and therefore is not intended to limit the scope of the present disclosure. An equivalent structural or flow changes made by using the content of the specification and drawings of the present disclosure, or any direct or indirect present disclosures of the disclosure on any other related fields shall all fall in the scope of the present disclosure.

What is claimed is:

1. A display panel, wherein the display panel comprises:
    a first substrate, the first substrate defines a photoresist layer;
    a second substrate, the second substrate defines an identification region, a surface of the first substrate having the photoresist layer faces a surface of the second substrate having the identification region; and
    a frame glue, the frame glue is defined between the first substrate and the second substrate, and the frame glue encloses a space between the first substrate and the second substrate to form a filling area, and the identification region is defined at the outside of the frame glue;
    the photoresist layer defines an anti-overflow groove, and the anti-overflow groove is located at an area between the identification region and the frame glue; the first substrate comprises a base substrate, and the photoresist layer comprises a black matrix coated on the base substrate; the anti-overflow groove is defined in the black matrix.

2. The display panel according to claim 1, wherein the anti-overflow groove is arranged at an angle or in an arc shape.

3. The display panel according to claim 1, wherein the anti-overflow groove comprises a plurality of grooves, the plurality of grooves are spaced from each other and defined between the identification region and the frame glue.

4. The display panel according to claim 1, wherein the anti-overflow groove has a width of 20 micrometers to 1000 micrometers.

5. The display panel according to claim 1, wherein the first substrate is a color film substrate, and the second substrate is an array substrate.

6. The display panel according to claim 1, wherein the first substrate further comprises a pixel electrode layer coated on the black matrix layer, and the pixel electrode layer forms a recess in the area where the anti-overflow groove is located, and another recess in the area where the light transmitting hole is located.

7. The display panel according to claim 1, wherein there are a plurality of identification regions, and the plurality of identification regions are respectively located at corners of the second substrate.

8. The display panel according to claim 1, wherein the identification region defines an alignment mark, and the alignment mark defines a cross pattern.

9. The display panel according to claim 6, wherein the photoresist layer further defines a light transmitting hole, and the light transmitting hole faces the identification region, and the identification region is identified by a side of the first substrate away from the second substrate.

10. A display panel, wherein the display panel comprises:
   a first substrate, the first substrate comprises a base substrate and a black matrix coated on the base substrate, the black matrix defines a plurality of light transmission holes;
   a second substrate, the second substrate comprises a plurality of identification regions, and the plurality of identification regions are respectively located at corners of the second substrate, and a surface of the first substrate having the black matrix faces a surface of the second substrate having the identification regions;
   a frame glue, the frame glue is defined between the first substrate and the second substrate, and the frame glue encloses a space between the first substrate and the second substrate to form a filling area, and the identification regions are defined at the outside of the frame glue;
   the light transmitting holes face the identification regions, the identification regions are identified by a side of the first substrate away from the second substrate, the black matrix further defines an anti-overflow groove, and the anti-overflow groove is located at an area between the identification region and the frame glue;
   the first substrate comprises a base substrate, and the photoresist layer comprises a black matrix coated on the base substrate; the anti-overflow groove is defined in the black matrix.

11. A display device, wherein the display device comprises a housing, a backlight module received in the housing, and a display panel embedded in the housing;
   the display panel comprises:
   a first substrate, the first substrate defines a photoresist layer;
   a second substrate, the second substrate defines an identification region, a surface of the first substrate having the photoresist layer faces a surface of the second substrate having the identification region; and
   a frame glue, the frame glue is defined between the first substrate and the second substrate, and the frame glue encloses a space between the first substrate and the second substrate to form a filling area, and the identification region is defined at the outside of the frame glue;
   the photoresist layer defines an anti-overflow groove, and the anti-overflow groove is located at an area between the identification region and the frame glue, the first substrate comprises a base substrate, and the photoresist layer comprises a black matrix coated on the base substrate; the anti-overflow groove is defined in the black matrix;
   light emitted by the backlight module irradiates the display panel, and an image displays on the display panel.

12. The display device according to claim 11, wherein the anti-overflow groove is arranged at an angle or in an arc shape.

13. The display device according to claim 11, wherein the anti-overflow groove comprises at least one groove, and when there are a plurality of grooves, the plurality of grooves are spaced from each other and defined between the identification region and the frame glue.

14. The display device according to claim 11, wherein the anti-overflow groove has a width of 20 micrometers to 1000 micrometers.

15. The display device according to claim 11, wherein the first substrate is a color film substrate, and the second substrate is an array substrate.

16. The display device according to claim 11, wherein the first substrate further comprises a pixel electrode layer coated on the black matrix layer, and the pixel electrode layer forms a recess in the area where the anti-overflow groove is located, and another recess in the area where the light transmitting hole is located.

17. The display device according to claim 11, wherein there are a plurality of identification regions, and the plurality of identification regions are respectively located at corners of the second substrate;
   and/or, the identification region defines an alignment mark.

18. The display device according to claim 16, wherein the photoresist layer further defines a light transmitting hole, and the light transmitting hole faces the identification region, and the identification region is identified by a side of the first substrate away from the second substrate.

* * * * *